United States Patent
Iesaki

(10) Patent No.: US 8,222,852 B2
(45) Date of Patent: Jul. 17, 2012

(54) MOTOR CONTROL DEVICE AND IMAGE FORMING SYSTEM

(75) Inventor: Kenichi Iesaki, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 255 days.

(21) Appl. No.: 12/728,676

(22) Filed: Mar. 22, 2010

(65) Prior Publication Data

US 2010/0245450 A1 Sep. 30, 2010

(30) Foreign Application Priority Data

Mar. 31, 2009 (JP) ................................. 2009-085997

(51) Int. Cl.
*G05B 11/06* (2006.01)

(52) U.S. Cl. ........ 318/629; 318/560; 318/625; 318/626; 318/627

(58) Field of Classification Search ................... 318/629, 318/560, 625–628
See application file for complete search history.

(56) References Cited

U.S. PATENT DOCUMENTS

| | | | |
|---|---|---|---|
| 5,467,004 A * | 11/1995 | Matsuo et al. | 318/807 |
| 5,710,500 A * | 1/1998 | Matsuo et al. | 318/799 |
| 2005/0120444 A1 | 6/2005 | Takenaka | |
| 2010/0245409 A1 | 9/2010 | Iesaki | |

FOREIGN PATENT DOCUMENTS

| | | |
|---|---|---|
| JP | H02-010411 A | 1/1990 |
| JP | H07-046874 A | 2/1995 |
| JP | H09-282008 A | 10/1997 |
| JP | H11-031014 A | 2/1999 |
| JP | 2004-110636 A | 4/2004 |
| JP | 2006-301682 A | 11/2006 |
| JP | 2007-283561 A | 11/2007 |
| JP | 2008-137449 A | 6/2008 |
| WO | 03/058355 A1 | 7/2003 |

OTHER PUBLICATIONS

Japan Patent Office, Notice of Reason(s) for Rejection for Patent Application No. JP 2009-085997 (counterpart to above-captioned patent application), mailed Feb. 15, 2011.

* cited by examiner

*Primary Examiner* — Walter Benson
*Assistant Examiner* — David Luo
(74) *Attorney, Agent, or Firm* — Baker Botts L.L.P.

(57) ABSTRACT

A motor control device of the present invention includes a correction input unit, a measurement unit, a first signal processing unit, and a second signal processing unit. The correction input unit corrects a control input signal outputted from a controller, and inputs a corrected control input signal into a motor. The measurement unit measures a physical quantity resulting from rotation of the motor corresponding to a control output. The first signal processing unit inputs a measurement signal representing the physical quantity inputted from the measurement unit into an inverse model 1/G of a transfer function G of a controlled object, and filters an output of the inverse model 1/G through a first low-pass filter. The second signal processing unit obtains a corrected control input signal to be inputted into the motor by the correction input unit, and filters the control input signal through a second low-pass filter.

6 Claims, 8 Drawing Sheets

MOTOR CONTROL DEVICE AND IMAGE FORMING SYSTEM

CROSS-REFERENCE TO RELATED APPLICATION

This application claims the benefit of Japanese Patent Application No. 2009-085997 filed Mar. 31, 2009 in the Japan Patent Office, the disclosure of which is incorporated herein by reference.

BACKGROUND

This invention relates to a motor control device and an image forming system.

Conventionally, a control system is known in which disturbance is estimated by a disturbance observer and a control input is corrected based on the estimated disturbance. FIG. 8 is a block diagram of a conventional motor control system 900 using a disturbance observer 910.

The control system shown in FIG. 8 is designed as follows. First, a transfer function G(s) of a controlled object (plant) is derived. Then, on the assumption that a relationship between a control output y and a control input u satisfies y=G(s)·u, a controller 920 is designed to output the control input u corresponding to a target control output $y_r$.

The control input u outputted from the controller 920 is corrected by adding thereto a correction amount d* generated in the disturbance observer 910. Disturbance is suppressed by inputting a corrected control input $u_c$=u+d* into the controlled object, and the control output y is controlled to the target control output $y_r$.

Specifically, the disturbance observer 910 generates a correction signal ($u_c$−1/G(s)·y) for suppressing disturbance based on an inverse model 1/G(s) of the transfer function G(s) and the control input $u_c$. The disturbance observer 910 filters the correction signal through a low-pass filter 930, and outputs a filtered correction signal as a correction signal representing the above correction amount d*.

A reason why the correction signal ($u_c$−1/G(s)·y) is filtered through the low-pass filter 930 is that the transfer function G(s) of the controlled object exhibits such frequency characteristics that the higher a frequency of a high-frequency component in the correction signal is, the lower a gain becomes.

When the transfer function G(s) exhibits such frequency characteristics, it should be appreciated that the inverse model 1/G(s) exhibits such frequency characteristics that the higher a frequency of a high-frequency component in the correction signal is, the higher a gain becomes. On the other hand, a measurement signal of the control output y includes a lot of observation noise in a high-frequency component.

Accordingly, when the measurement signal of the control output y is inputted into the inverse model 1/G(s) to generate the correction signal ($u_c$−1/G(s)·y), the observation noise is amplified in the correction signal. Therefore, the low-pass filter 930 is used to suppress influence of the observation noise and accurately achieve disturbance suppression.

SUMMARY

In order to suppress the influence of the observation noise by using the low-pass filter 930, it is preferable to reduce a cutoff frequency $\omega_c$ of the low-pass filter 930. In contrast, in order to fully obtain disturbance information to generate an appropriate correction signal, it is preferable to increase the cutoff frequency $\omega_c$.

However, since these situations are mutually contradictory, there are some limitations, in the prior art, in suppressing disturbance even if the control input u outputted from the controller 920 is corrected using the disturbance observer 910. In short, in the prior art, there are limitations in achieving a high accuracy control by suppressing influence of disturbance.

In a first aspect of the present invention, it is preferable to be able to suppress disturbance more accurately, in a control system, than was conventionally possible.

A motor control device according to the present invention includes a correction input unit, a measurement unit, a first signal processing unit, and a second signal processing unit.

The correction input unit corrects a control input signal outputted from a controller, and inputs a corrected control input signal into a motor.

The measurement unit measures a physical quantity resulting from rotation of the motor corresponding to a control output.

The first signal processing unit inputs a measurement signal representing the physical quantity inputted from the measurement unit into an inverse model 1/G of a transfer function G of a controlled object, and filters an output of the inverse model 1/G through a first low-pass filter.

The second signal processing unit obtains a corrected control input signal to be inputted into the motor by the correction input unit, and filters the control input signal through a second low-pass filter.

In this motor control device, the correction input unit corrects the control input signal outputted from the controller by adding a signal filtered by the second signal processing unit to the control input signal outputted from the controller and also by subtracting a signal filtered by the first signal processing unit from the control input signal outputted from the controller. A cutoff frequency of the second low-pass filter is set to be higher than that of the first low-pass filter.

BRIEF DESCRIPTION OF THE DRAWINGS

The preferred embodiments of the present invention will be described hereinafter with reference to the accompanying drawings, in which.

DETAILED DESCRIPTION OF THE PREFERRED EMBODIMENTS

First of all, a basic design methodology and a basic constitution of a control system according to the present invention will be described.

[Design Methodology and Constitution of Control System]

Figure 1A:
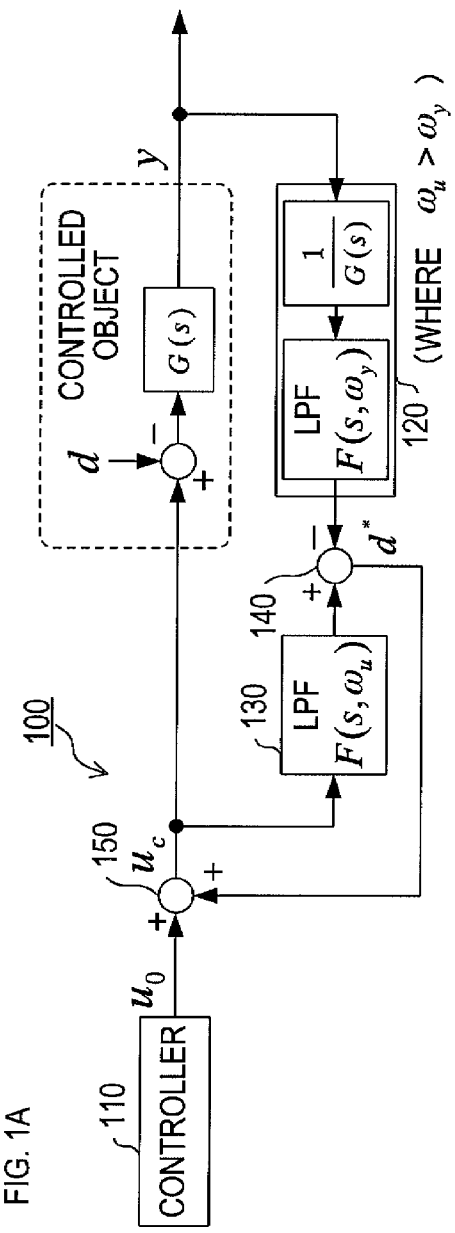
FIG. 1A is a block diagram of a control system 100.

Prior to constructing the control system 100 shown in FIG. 1A, a transfer function G(s) of a controlled object (plant) is initially derived as in the prior art. And then, on the assumption that a relationship between a control output y and a control input u satisfies y=G(s)·u, a controller 110, which outputs a control input $u_0$ corresponding to a target control output $y_r$, is designed. A variable s used here is a Laplace operator.

Then, in order to suppress disturbance, a signal processor 120 is designed using an inverse model 1/G(s) of the transfer function G(s).

Specifically, the signal processor 120 is designed in which an input/output relationship is represented by a synthetic transfer function E(s)=F(s,$\omega_y$)/G(s), which is obtained by synthesizing the inverse model 1/G(s) and a transfer function F(s,$\omega_c$=$\omega_y$) functioning as a low-pass filter. The low-pass filter has a cutoff frequency $\omega_c$, which is equal to $\omega_y$ ($\omega_c$=$\omega_y$).

The cutoff frequency $\omega_y$ is determined in consideration of observation noise of the control output y. Hereinafter, the signal processor 120 is referred to as a first signal processor 120. Generally, the transfer function F(s,$\omega_c$=$\omega_y$) may be represented by the following mathematical formula (1), wherein a variable n is a relative degree n=n2−n1 between n1 and n2. n1 represents a degree of a numerator of the transfer function G(s), and n2 represents a degree of a denominator of the transfer function G(s).

[Mathematical Formula 1]

$$F(s, \omega_c) = \left(\frac{\omega_c}{s + \omega_c}\right)^n \quad (1)$$

The control system 100 is designed so that a measurement signal representing the control output y is inputted into the first signal processor 120.

If disturbance −d is added to a control input $u_c$, which is inputted into the controlled object, an output of the inverse model obtained by inputting the control output y into the inverse model 1/G(s) becomes (1/G(s))·y=$u_c$−d. Accordingly, an output (d1=E(s)·y) of the first signal processor 120 is a signal obtained by applying the low-pass filter to a signal obtained by adding the disturbance to the control input $u_c$.

In addition, a second signal processor 130 is introduced to the control system 100. The second signal processor 130 is the same type as the low-pass filter adopted in the first signal processor 120, and is a low-pass filter (transfer function F(s, $\omega_c$=$\omega_u$)) having a higher cutoff frequency $\omega_u$ than the cutoff frequency $\omega_y$ of the first signal processor 120 ($\omega_u$>$\omega_y$). The cutoff frequency $\omega_u$ is determined within a frequency band higher than the cutoff frequency $\omega_y$ in consideration of disturbance.

The control system 100 is designed so that a control input signal is inputted into the second signal processor 130. The control input signal represents the control input $u_c$ to be inputted into the controlled object.

In addition, a correction signal generator 140 is introduced to the control system 100. The correction signal generator 140 subtracts the output (d1=(F(s,$\omega_y$)/G(s))·y) of the first signal processor 120 from an output (d2=(F(s,$\omega_u$)·$u_c$) of the second signal processor 130 to generate a correction signal representing a correction amount d*=d2−d1.

A corrector 150 is additionally introduced to the control system 100. The corrector 150 corrects a control input signal (control input $u_0$) outputted from the controller 110 by adding the correction signal (correction amount d*) outputted from the correction signal generator 140 to the control input signal representing the control input $u_0$ outputted from the controller 110. Then, a corrected control input signal (control input $u_c$=$u_0$+d*) is inputted into the controlled object. In this way, the control system 100, which has adopted technical idea of the present invention, is designed.

According to the control system 100, the correction signal (correction amount d*) is generated using the two low-pass filters having different cutoff frequencies $\omega_c$. The control input signal outputted from the controller 110 is corrected using the correction signal. Consequently, the observation noise can be appropriately removed while keeping disturbance information unremoved. Disturbance can be, therefore, accurately suppressed and the control output y can be controlled to the target control output $y_r$.

Figure 1B:
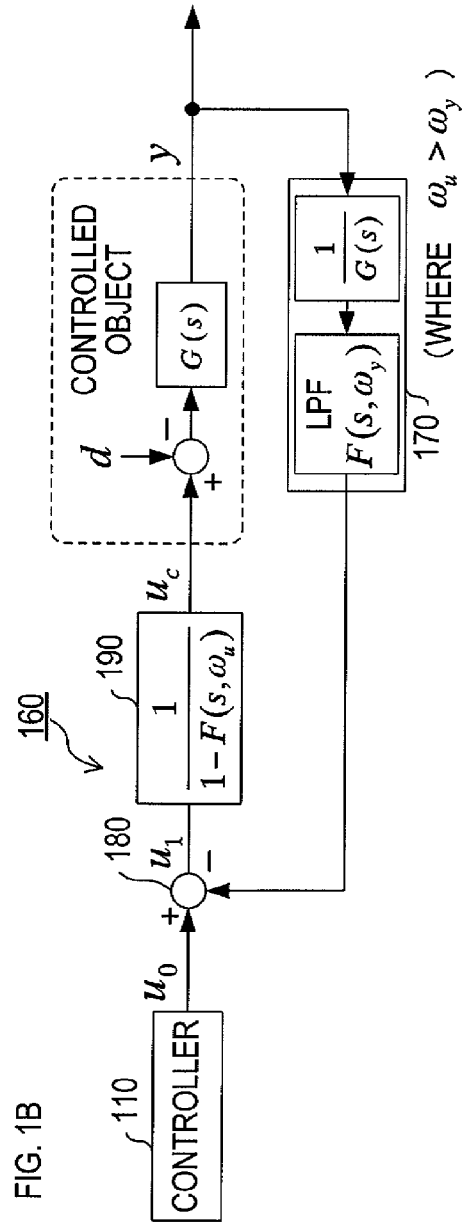
FIG. 1B is a block diagram of a control system 160.

In the meantime, the control system 100 may be made to have a constitution shown in FIG. 1B when equivalently converted.

The control system 160 shown in FIG. 1B includes a signal processor 170 having a same constitution as the first signal processor 120 in the control system 100. The control system 160 further includes a precorrector 180 and a postcorrector 190 as constituents for correcting a control input signal (control input $u_0$) outputted from the controller 110.

In the control system 160, the signal processor 170 inputs a measurement signal representing the control output y into the transfer function E(s). On the other hand, the precorrector 180 corrects the control input signal (control input $u_0$) by subtracting an output (d1=E(s)·y) of the signal processor 170 from the control input signal (control input $u_0$) outputted from the controller 110.

And the postcorrector 190 inputs a control input signal (control input $u_1$=$u_0$−E(s)·y) corrected by the precorrector 180 into a transfer function H(s) represented by the following mathematical formula (2) to generate a final control input signal (control input $u_c$=H(s)·$u_1$) to be inputted into a controlled object. A transfer function F(s,$\omega_u$) shown in the mathematical formula (2) is a transfer function of the low-pass filter adopted in the second signal processor 130 in the control system 100.

[Mathematical Formula 2]

$$H(s) = \frac{1}{1 - F(s, \omega_u)} \quad (2)$$

Then, the postcorrector 190 inputs the control input signal (control input $u_c$=H(s)·$u_1$) into the controlled object. The control system 160 constituted as such can also perform a similar signal processing as in the control system 100. As a result, disturbance can be accurately suppressed and the control output y can be controlled to the target control output $y_r$.

Accordingly, in constructing a control system according to the present invention, either constitution of the control system 100 or the control system 160 may be adopted.

[Examples of Application to Printer Apparatus]

Next, a constitution of a printer apparatus 1 to which the control system 100 or 160 is adopted will be described as an embodiment of the present invention.

Figure 2:
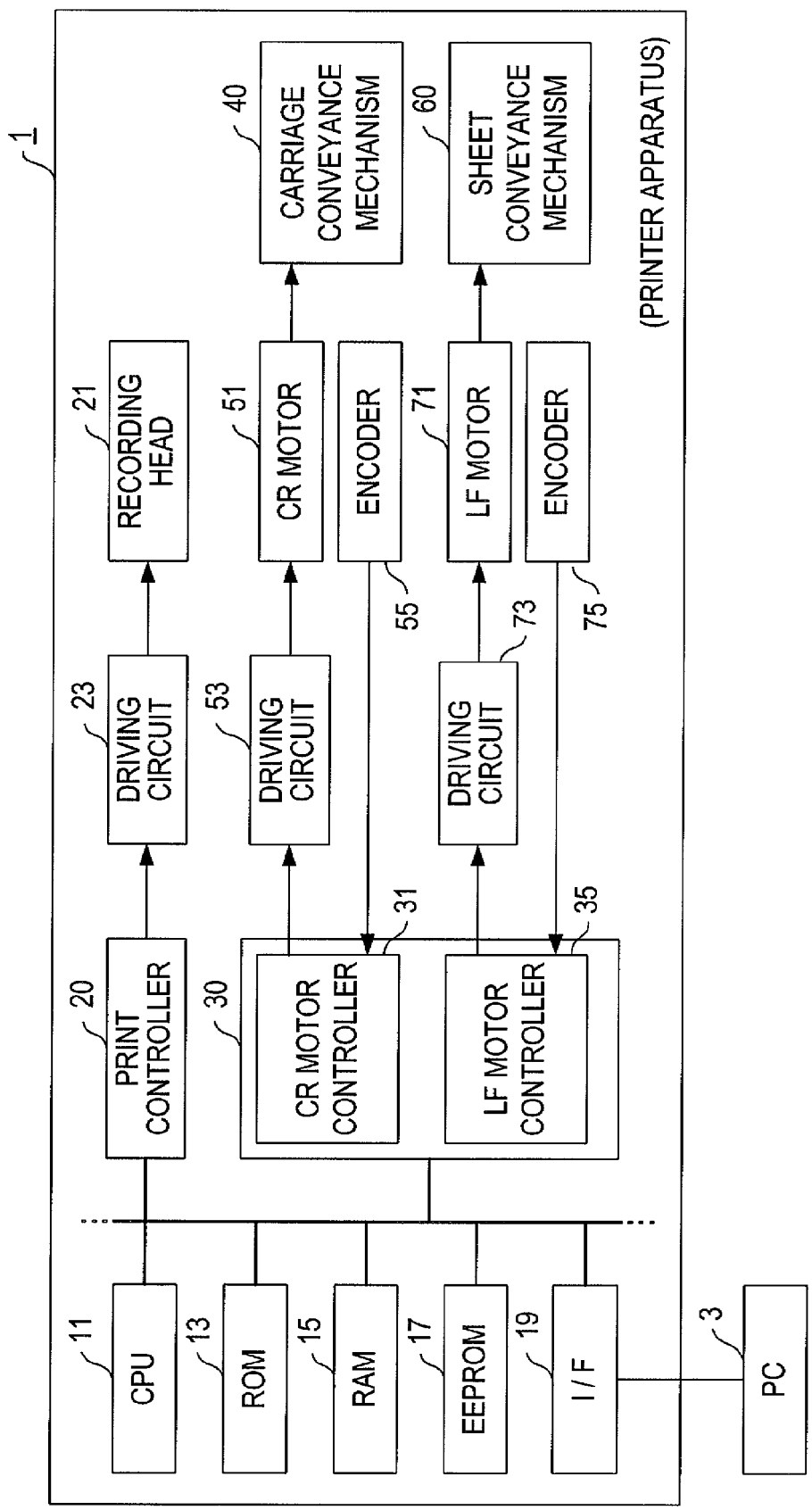
FIG. 2 is a diagram showing a constitution of a printer apparatus 1.

As shown in FIG. 2, the printer apparatus 1 includes a CPU 11, a ROM 13, a RAM 15, an EEPROM 17, an interface 19 (USB interface, for example), a print controller 20, and a motor controller 30. The ROM 13 stores programs and others executed by the CPU 11. The RAM 15 is used as a work area during execution of the programs. The EEPROM 17 stores various setting information. The interface 19 is connected to a personal computer (PC) 3 and receives a print command transmitted from the PC 3 and print object data transmitted together with the print command.

The printer apparatus 1 also includes a recording head 21, a head driving circuit 23, a CR (carriage) motor 51, a driving circuit 53, and an encoder 55 (so-called rotary encoder). The recording head 21 includes a plurality of nozzles arranged thereon that eject ink droplets. The driving circuit 23 drives the recording head 21 to eject the ink droplets. The CR motor 51 supplies drive power to a carriage conveyance mechanism 40 to move a carriage 41 carrying the recording head 21 in a main scanning direction. The CR motor 51 is composed of a direct current motor. The driving circuit 53 drives the CR motor 51. The encoder 55 is provided on a rotation shaft of the CR motor 51 to output pulse signals each time the CR motor 51 rotates a predetermined angle.

The printer apparatus 1 further includes a sheet conveyance mechanism 60, an LF (line feed) motor 71, a driving circuit 73, and an encoder 75 (rotary encoder) as constituents that convey a sheet to a position where printing is performed by the recording head 21.

The sheet conveyance mechanism 60 includes a plurality of conveyance rollers 61 (see FIG. 3) having rotation shafts extending in the main scanning direction, and conveys the sheet sandwiched between the conveyance rollers 61 in a sub-scanning direction due to rotation of the conveyance rollers 61. The LF motor 71 supplies drive power to the conveyance rollers 61 provided in the sheet conveyance mechanism 60 to rotate the conveyance rollers 61. The LF motor 71 is composed of a direct current motor as well as the CR motor 51. The driving circuit 73 drives the LF motor 71. The encoder 75 is provided on a rotation shaft of the LF motor 71 to output pulse signals each time the LF motor 71 rotates a predetermined angle.

Figure 3:
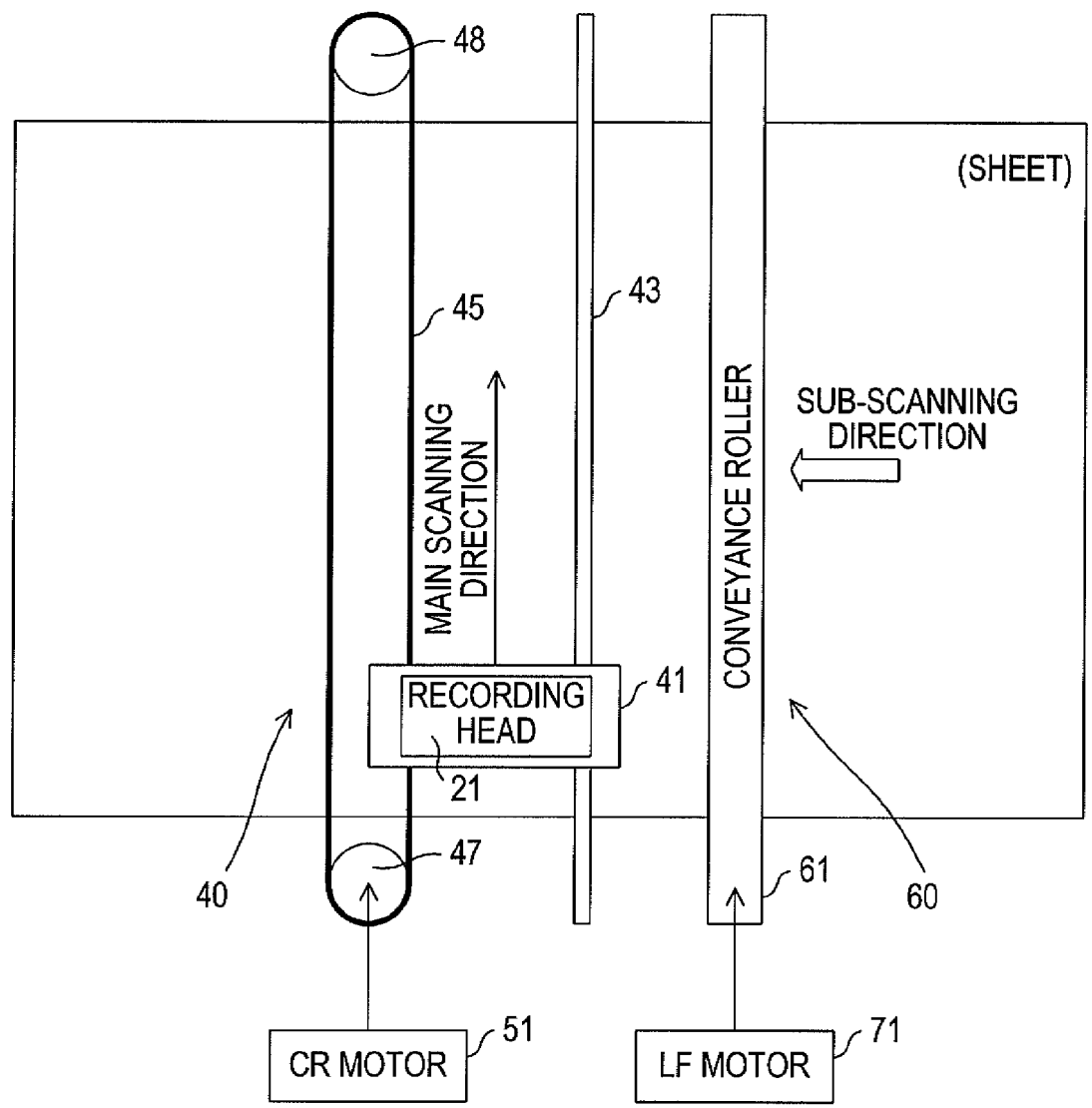
FIG. 3 is a diagram showing a constitution of a carriage conveyance mechanism 40 and a sheet conveyance mechanism 60.

As shown in FIG. 3, the carriage conveyance mechanism 40 is constituted such that the carriage 41 is slidably mounted on a guide shaft 43 extending in the main scanning direction and also connected to an endless belt 45. Hereinafter, see FIG. 3.

The endless belt 45 is supported by and between a pulley 47 and an idle pulley 48. The endless belt 45 receives drive power from the CR motor 51 via a gear (not shown) provided on a rotation shaft of the pulley 47. In other words, in the carriage conveyance mechanism 40, the endless belt 45 rotates together with rotation of the pulley 47, and thereby the carriage 41 moves in the main scanning direction along the guide shaft 43.

In the present embodiment, the recording head 21 mounted on the carriage 41 is constituted identically to a known piezo type ink-jet head. Specifically, when a driving voltage is applied from the head driving circuit 23 (see FIG. 2), the recording head 21 deforms its piezoelectric portion adjacent to an ink chamber to change a volume of the ink chamber. As a result, ink inside the ink chamber is ejected from the nozzles toward the sheet. The recording head 21 moves in the main scanning direction by being conveyed by the carriage 41 which moves as described above.

The sheet conveyance mechanism 60 is constituted such that the conveyance rollers 61 rotate in receipt of rotation force of the LF motor 71 via a gear (not shown) and thereby the sheet moves in the sub-scanning direction.

When an image is formed onto the sheet by means of the recording head 21, the sheet is conveyed in such a manner that, each time the recording head 21 moves in the main scanning direction to form an image onto the sheet by a predetermined number of lines, a predetermined amount of the sheet is sent forth due to the rotation of the conveyance rollers 61.

See FIG. 2 again. The interface 19 receives the print command and the print object data from the external PC 3. That prompts the print controller 20 to control the recording head 21 via the head driving circuit 23 in accordance with a command inputted from the CPU 11, thereby to form an image based on the print object data onto the sheet. Specifically, as in a known printer apparatus, the print controller 20 applies a driving voltage to the recording head 21 in synchronization with the movement of the carriage 41 based on the pulse signals inputted from the encoder 55. That causes the recording head 21 to eject ink droplets from the nozzles.

The motor controller 30 includes a CR motor controller 31 and an LF motor controller 35. The CR motor controller 31 controls the CR motor 51, and the LF motor controller 35 controls the LF motor 71 in accordance with a command from the CPU 11.

Specifically, the CR motor controller 31 measures an angular velocity $\omega$ of the CR motor 51 based on the pulse signals inputted from the encoder 55. On the basis of a result of the measurement, the CR motor controller 31 controls the angular velocity $\omega$ of the CR motor 51 to achieve a target velocity $\omega_r$. Through this operation, the CR motor controller 31 controls a moving speed of the carriage 41 which moves in synchronization with rotation of the CR motor 51. Specifically, the moving speed of the carriage 41 is controlled so that the carriage 41 moves at a constant speed in an area where an image is formed onto a sheet.

On the other hand, the LF motor controller 35 measures a rotation amount $\theta$ of the LF motor 71 based on the pulse signals inputted from the encoder 75. On the basis of a result of the measurement, the LF motor controller 35 controls the rotation amount $\theta$ of the LF motor 71 to achieve a target rotation amount $\theta_r$. Through this operation, the LF motor controller 35 controls a moving amount (feeding amount) of a sheet which moves in synchronization with rotation of the LF motor 71.

In other words, when the print command and the print object data are inputted via the interface 19, the CPU 11 operates the print controller 20 to make the recording head 21 perform ejecting operation of ink droplets in order to form an image based on the print object data onto the sheet. Additionally, the CPU 11 operates the CR motor controller 31 to move the carriage 41 (and therefore the recording head 21) in the main scanning direction. Each time the carriage 41 moves along a moving path in the main scanning direction from end to end, the CPU 11 further operates the LF motor controller 35 to move the sheet by a predetermined amount in the sub-scanning direction. As a result, the image is gradually formed onto the sheet, and the image based on the print object data is to be completed on the sheet.

Figure 4:
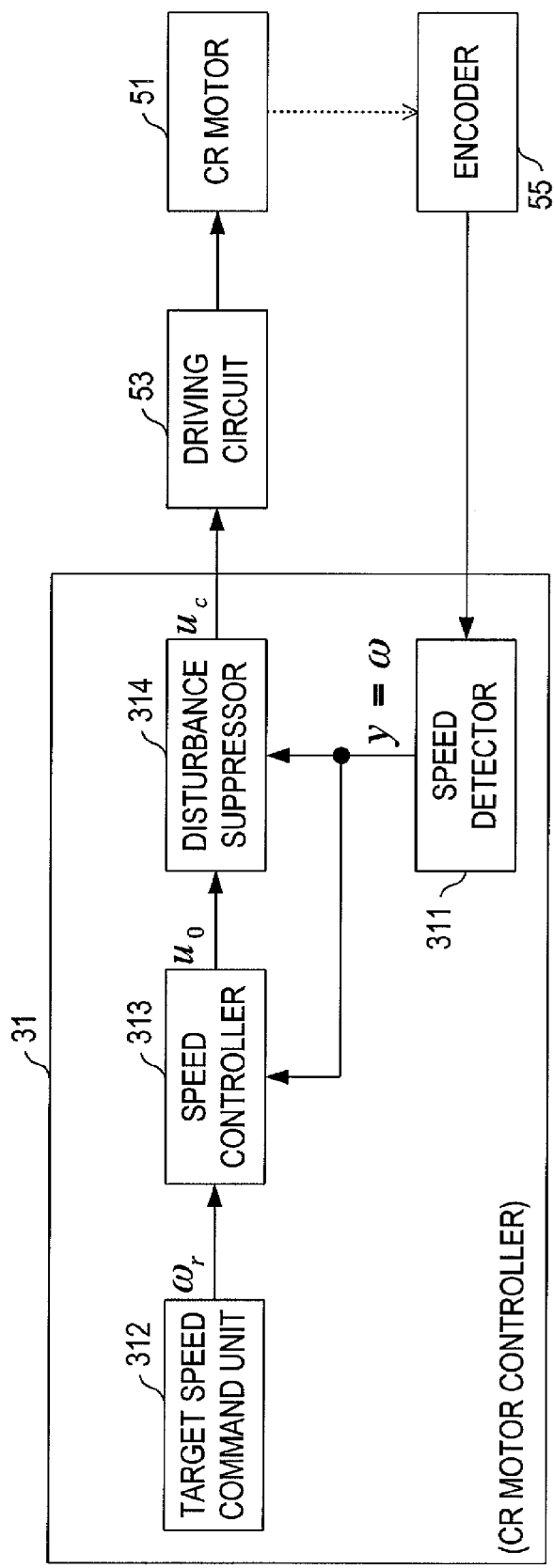
FIG. 4 is a block diagram of a speed control system included in a CR motor controller 31.

Now, a constitution of the CR motor controller 31 will be detailed. As shown in FIG. 4, the CR motor controller 31 includes a speed detector 311, a target speed command unit 312, a speed controller 313, and a disturbance suppressor 314 as a speed control system.

The speed detector 311 measures the angular velocity $\omega$ of the CR motor 51 based on the pulse signals inputted from the encoder 55, and inputs a measurement signal representing a measurement $\omega_m$ of the angular velocity $\omega$ into the speed controller 313 and the disturbance suppressor 314.

On the other hand, the target speed command unit 312 inputs a target command signal representing a target speed $\omega_r$ into the speed controller 313 in accordance with a predetermined target profile. The target speed $\omega_r$ shown in the target profile includes an acceleration region, a constant speed region, and a deceleration region as in a known ink-jet printer. And the carriage 41 is constituted to move at a constant speed in an area where an image is formed onto a sheet with ink droplets ejected by the carriage 41.

The speed controller 313 generates a control input signal for controlling the CR motor 51 based on the measurement signal representing the angular velocity ω inputted from the speed detector 311 and the target command signal inputted from the target speed command unit 312, and inputs the control input signal into the disturbance suppressor 314. In the present embodiment, a constitution is adopted in which current control is performed on the CR motor 51. The speed controller 313 inputs the control input signal (control input $u_O$), which represents an input current to the CR motor 51, into the disturbance suppressor 314.

Specifically, the speed controller 313 inputs the control input signal representing a manipulated variable (control input $u_O$) into the disturbance suppressor 314 based on the target speed $\omega_r$ and the measurement $\omega_m$ of the angular velocity. The manipulated variable is intended to reduce a deviation $e=\omega_r-\omega_m$ between the target speed $\omega_r$ and the measurement $\omega_m$.

Figure 5A:
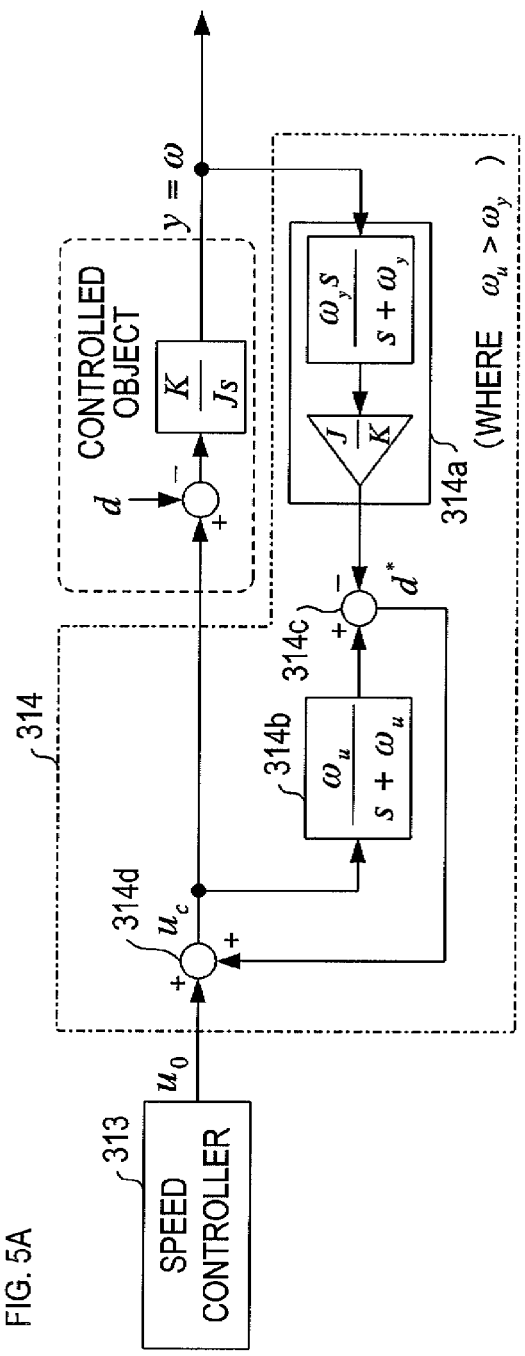
FIG. 5A is a block diagram showing a constitution of a disturbance suppressor 314.

As shown in FIG. 5A, the disturbance suppressor 314 includes a first signal processor 314a, a second signal processor 314b, a correction signal generator 314c, and a corrector 314d. The disturbance suppressor 314 is constituted to correct the control input signal (control input $u_O$) outputted from the speed controller 313 and input a corrected control input signal (control input $u_c$) into the driving circuit 53 in a same manner as in the control system 100.

The driving circuit 53 drives the CR motor 51 with a current amount corresponding to the control input $u_c$ represented by the control input signal inputted from the corrector 314d. Influence of cogging or the like of a motor may be thereby suppressed and, consequently, the CR motor 51 is so driven as to rotate at the target speed $\omega_r$.

When a motor system of the CR motor 51 connected to the carriage conveyance mechanism 40 is expressed using a rigid body model, the motor system may be represented by the following mathematical formula (3).

[Mathematical Formula 3]

$$J\frac{d\omega}{dt} = Ki \qquad (3)$$

In the above mathematical formula (3), i represents input current to the CR motor 51, K represents a torque constant, and J represents a moment of inertia. Accordingly, when i is set to the control input u, and ω is set to the control output y, a transfer function G(s) of the CR motor 51 may be represented by the following mathematical formula (4).

[Mathematical Formula 4]

$$G(s) = \frac{K}{Js} \qquad (4)$$

In FIG. 5A, a transfer function G(s) of the CR motor 51 is set to the mathematical formula (4).

Specifically, the first signal processor 314a inputs the measurement signal representing the angular velocity ω outputted from the speed detector 311 into a synthetic transfer function E(s) represented by the following mathematical formula (5). The synthetic transfer function E(s) is obtained by synthesizing the inverse model 1/G(s) of the transfer function G(s) and the transfer function $F(s,\omega_y)$ functioning as the low-pass filter.

[Mathematical Formula 5]

$$E(s) = \frac{J}{K} \cdot \frac{\omega_y s}{s+\omega_y} \qquad (5)$$

The first signal processor 314a inputs an output ($d1=E(s)\cdot\omega_m$) of the synthetic transfer function E(s) into the correction signal generator 314c. According to the synthetic transfer function E(s), a high-pass filter may be achieved in which a gain of a high frequency component is suppressed. Therefore, according to the present embodiment, saturation of the high-frequency component in an output signal of the inverse model may be inhibited.

On the other hand, the second signal processor 314b obtains the control input signal (control input $u_c$) to be inputted into the driving circuit 53, and filters the control input signal with a transfer function $F(s,\omega_u)$ functioning as a low-pass filter, which is represented by the following mathematical formula (6).

[Mathematical Formula 6]

$$F(s,\omega_u) = \frac{\omega_u}{s+\omega_u} \qquad (6)$$

Then, the second signal processor 314b inputs a filtered signal ($d2=F(s,\omega_u)\cdot u_c$) into the correction signal generator 314c.

The correction signal generator 314c subtracts the output ($d1=E(s)\cdot\omega_m$) of the first signal processor 314a from the output ($d2=F(s,\omega_u)\cdot u_c$) of the second signal processor 314b to generate a correction signal having a correction amount $d^*=d2-d1$, and inputs the generated correction signal into the corrector 314d.

Then, the corrector 314d adds the correction signal (correction amount $d^*$) inputted from the correction signal generator 314c to the control input signal (control input $u_O$) inputted from the speed controller 313. Further, the corrector 314d inputs a corrected control input signal (control input $u_c=u_O+d^*$) into the driving circuit 53. The cutoff frequency $\omega_u$ is, of course, greater than the cutoff frequency $\omega_y$ ($\omega_u>\omega_y$).

According to the CR motor controller 31 having the disturbance suppressor 314 constituted as such, influence of disturbance such as cogging may be suppressed and, therefore, it is possible to allow the CR motor 51 to accurately rotate at the target speed $\omega_r$. As a result, when ink droplets are ejected from the recording head 21, fluctuation of the speed of the carriage 41 can be inhibited more appropriately than was conventionally possible.

Consequently, according to the printer apparatus 1 of the present embodiment, it can be inhibited that image quality of an image formed onto a sheet is deteriorated because landing positions of the ink droplets ejected from the recording head 21 are displaced due to the fluctuation of the speed of the carriage 41. As a result, an image with higher quality than was conventionally possible can be formed onto the sheet without being influenced by cogging or the like of the motor.

Figure 5B:
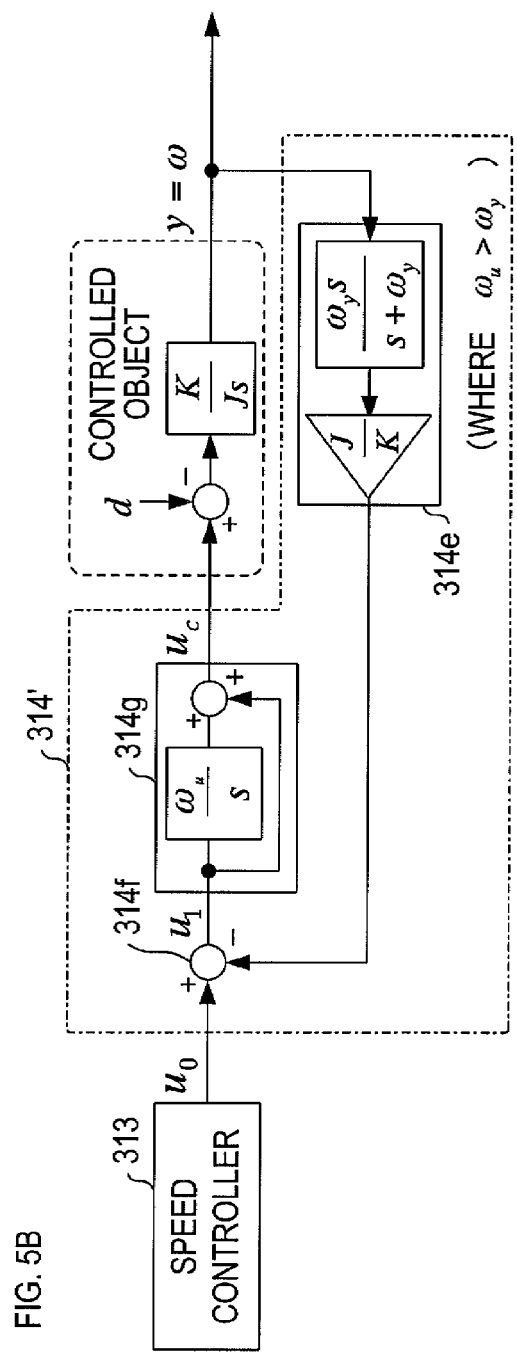
FIG. 5B is a block diagram showing a constitution of a disturbance suppressor 314'.

In the meantime, the disturbance suppressor 314 may have a similar constitution as in the control system 160 (see FIG. 5B).

As shown in FIG. 5B, the disturbance suppressor 314' includes a signal processor 314e, a precorrector 314f, and a postcorrector 314g. The signal processor 314e has a same constitution as the first signal processor 314a. The precorrector 314f and the postcorrector 314g correct the control input signal (control input $u_0$) inputted from the speed controller 313.

In the disturbance suppressor 314', the precorrector 314f subtracts an output (d1=E(s)·$\omega_m$) of the signal processor 314e from the control input signal (control input $u_0$) inputted from the speed controller 313 to generate a control input signal representing a control input $u_1=u_0-E(s)\cdot\omega_m$.

The postcorrector 314g inputs the control input signal (control input $u_1=u_0-E(s)\cdot\omega_m$) corrected by the precorrector 314f into a transfer function H(s) presented by the following mathematical formula (7) to generate a final control input signal (control input $u_c=H(s)\cdot u_1$) to be inputted into the driving circuit 53.

[Mathematical Formula 7]

$$H(s) = 1 + \frac{\omega_u}{s} \quad (7)$$

Then, the postcorrector 314g inputs the control input signal (control input $u_c=H(s)\cdot u_1$) into the driving circuit 53. The cutoff frequency $\omega_u$ is, of course, greater than the cutoff frequency $\omega_y$ ($\omega_u > \omega_y$).

The disturbance suppressor 314' constituted as such can also accurately suppress disturbance and control the angular velocity $\omega$ of the CR motor 51 to the target speed $\omega_r$. Consequently, it can be inhibited that the impact points of the ink droplets are displaced and, therefore, an image with high image quality can be formed onto a sheet.

[Examples of Application to Position Control System]

Now, examples where the control system 100 or 160 is applied to a position control system will be described. For example, it is assumed that the CR motor controller 31 is constituted to switch a motor control from a speed control to a position control during deceleration of the carriage 41, and to control the CR motor 51 by the position control system.

Figure 6:
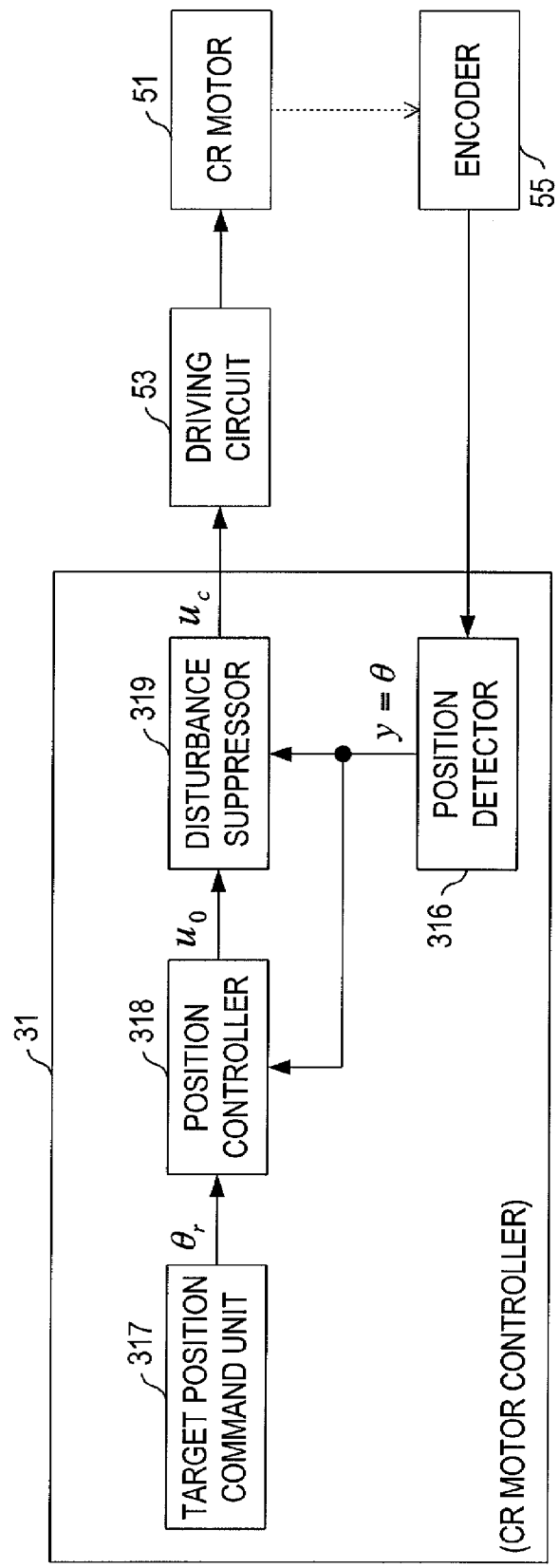
FIG. 6 is a block diagram of a position control system included in the CR motor controller 31.

In this case, as shown in FIG. 6, the CR motor controller 31 includes a position detector 316, a target position command unit 317, a position controller 318, and a disturbance suppressor 319 as a position control system.

In the position control system shown in FIG. 6, the position detector 316 measures a rotation amount θ of the CR motor 51 from either of a start of position control or a start of carriage conveyance, based on the pulse signals inputted from the encoder 55, and inputs a measurement signal representing a measurement $\theta_m$ of the rotation amount into the position controller 318 and the disturbance suppressor 319.

On the other hand, the target position command unit 317 inputs a target command signal representing a target position (rotation amount) $\theta_r$ into the position controller 318 in accordance with a target profile. Then, the position controller 318 generates a control input signal (control input $u_0$), which represents an input current to the CR motor 51, based on the measurement signal representing the rotation amount θ inputted from the position detector 316 and the target command signal inputted from the target position command unit 317. The position controller 318 inputs the generated control input signal into the disturbance suppressor 319.

Specifically, the position controller 318 inputs the control input signal representing a manipulated variable (control input $u_0$) into the disturbance suppressor 319 based on the target position $\theta_r$ and the measurement $\theta_m$ of the rotation amount. The manipulated variable is intended to reduce a deviation $e=\theta_r-\theta_m$ between the target position $\theta_r$ and the measurement $\theta_m$.

Figure 7A:
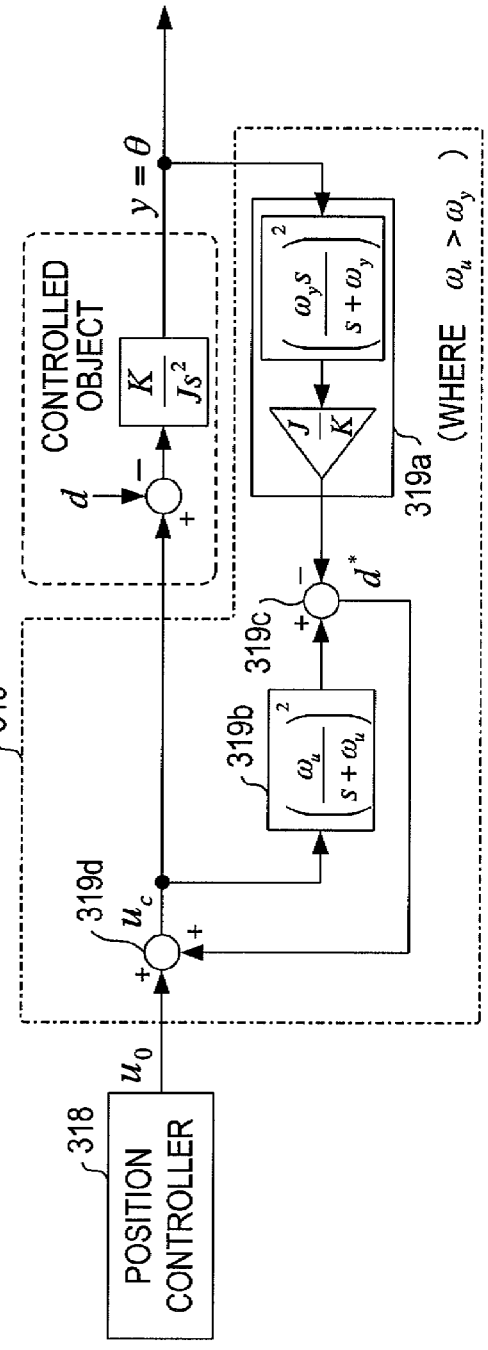
FIG. 7A is a block diagram showing a constitution of a disturbance suppressor 319.

As shown in FIG. 7A, the disturbance suppressor 319 includes a first signal processor 319a, a second signal processor 319b, a correction signal generator 319c, and a corrector 319d. By using each of them, the disturbance suppressor 319 corrects the control input signal (control input $u_0$) outputted from the position controller 318, and inputs a corrected control input signal (control input $u_c$) into the driving circuit 53.

Then, the driving circuit 53 controls the rotation amount θ of the CR motor 51 to the target position $\theta_r$ by driving the CR motor 51 with a current amount corresponding to the control input $u_c$ represented by the control input signal inputted from the corrector 319d.

When a motor system of the CR motor 51 connected to the carriage conveyance mechanism 40 is expressed using a rigid body model, a transfer function G(s) representing an input/output relationship is represented by the following mathematical formula (8). This is based on the assumption that the control input u is an input current to the CR motor 51 and the control output y is a rotation amount θ of the CR motor 51

[Mathematical Formula 8]

$$G(s) = \frac{K}{Js^2} \quad (8)$$

In FIG. 7A, a transfer function G(s) of the CR motor 51 is set to the mathematical formula (8).

In this case, the first signal processor 319a inputs the measurement signal outputted from the position detector 316 into a synthetic transfer function E(s) represented by the following mathematical formula (9). The synthetic transfer function E(s) is obtained by synthesizing the inverse model 1/G(s) and the transfer function $F(s,\omega_y)$ functioning as a low-pass filter.

[Mathematical Formula 9]

$$E(s) = \frac{J}{K} \cdot \left(\frac{\omega_y s}{s+\omega_y}\right)^2 \quad (9)$$

The first signal processor 319a inputs an output (d1=E(s)·$\theta_m$) of the synthetic transfer function E(s) into the correction signal generator 319c.

On the other hand, the second signal processor 319b obtains the control input signal (control input $u_c$) to be inputted into the driving circuit 53, and filters the control input signal with a transfer function $F(s,\omega_u)$ represented by the following mathematical formula (10).

[Mathematical Formula 10]

$$F(s, \omega_u) = \left(\frac{\omega_u}{s+\omega_u}\right)^2 \quad (10)$$

The first signal processor 319a inputs a filtered signal (d2=$F(s,\omega_u)\cdot u_c$) into the correction signal generator 319c.

Then, the correction signal generator 319c subtracts the output (d1=E(s)·$\theta_m$) of the first signal processor 319a from the output (d2=$F(s,\omega_u)\cdot u_c$) of the second signal processor 319b to generate a correction signal having a correction amount d*=d2−d1. The corrector 319d adds the correction signal (correction amount d*) inputted from the correction signal generator 319c to the control input signal (control input $u_0$) inputted from the position controller 318. Furthermore, the corrector 319d inputs a corrected control input signal (control input $u_c=u_0+d^*$) into the driving circuit 53. The cutoff frequency $\omega_u$ is, of course, greater than the cutoff frequency $\omega_y$ ($\omega_u > \omega_y$).

When the disturbance suppressor 319 constituted as such is used, it is possible to accurately suppress disturbance and control the rotation amount θ of the CR motor 51 to the target position $\theta_r$.

The LF motor controller 35 controls the LF motor 71 with a position control system. Therefore, a constitution similar to the above-described position control system of the CR motor controller 31 may be adopted to the LF motor controller 35 to suppress disturbance.

Figure 7B:
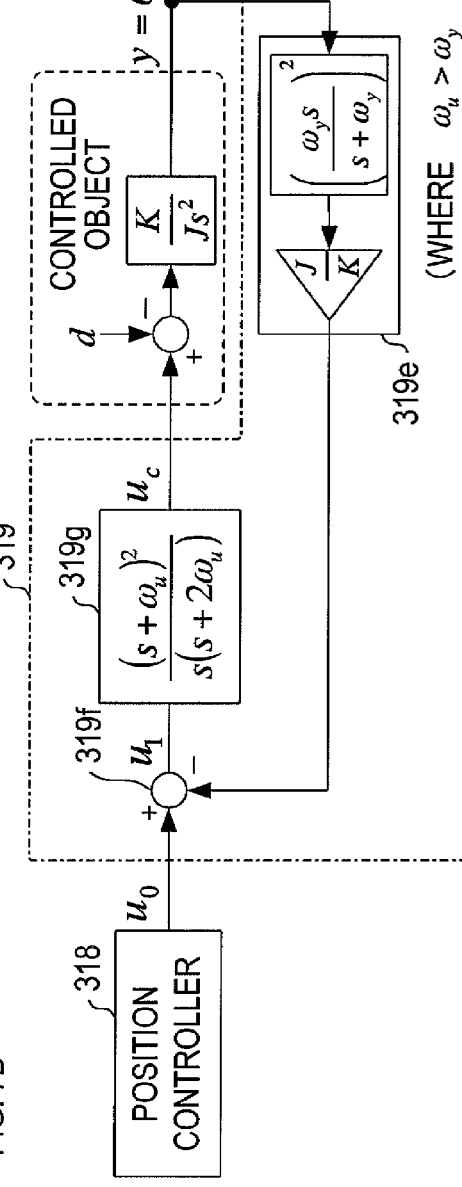
FIG. 7B is a block diagram showing a constitution of a disturbance suppressor 319'.
Figure 8:
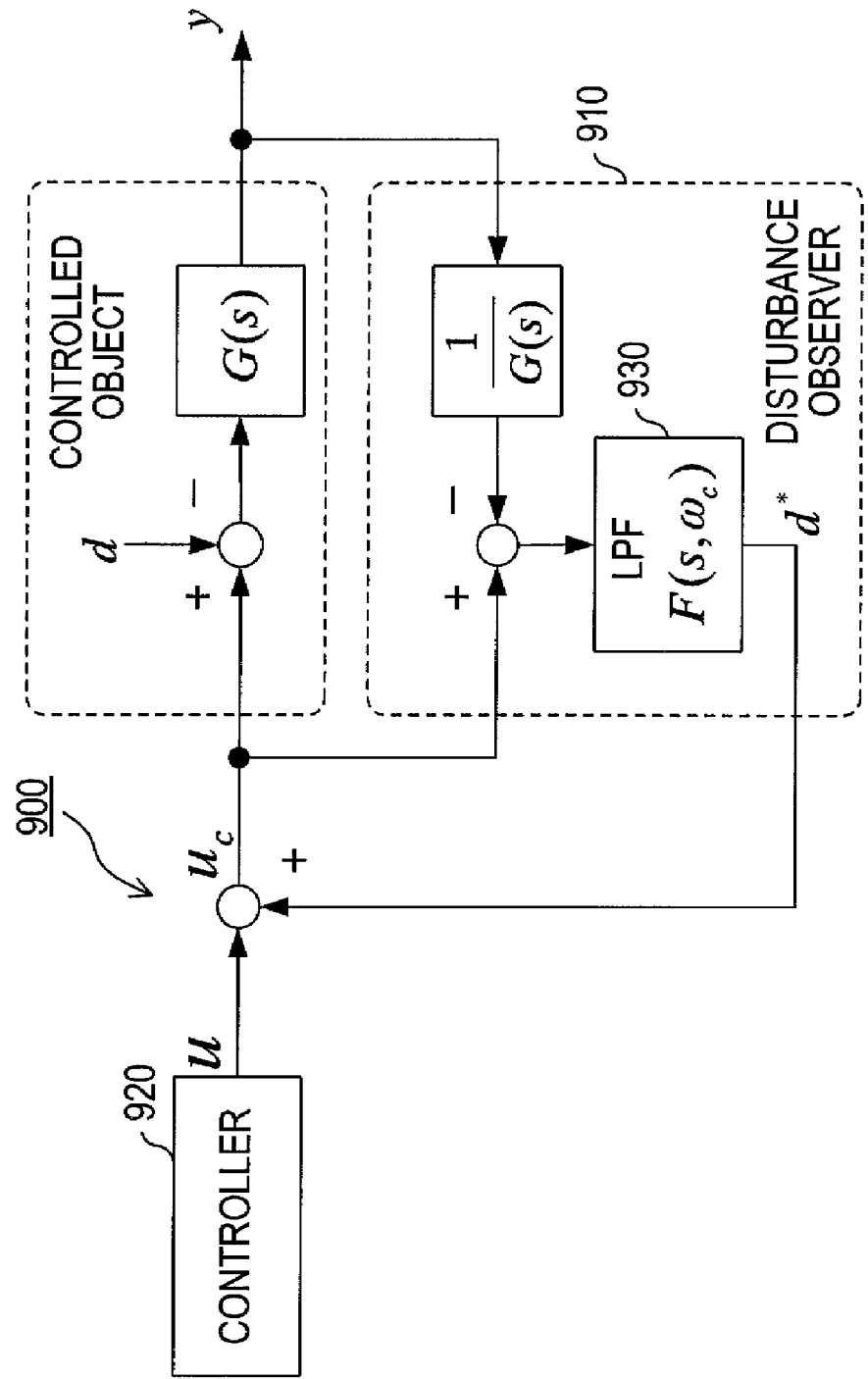
FIG. 8 is a block diagram of a conventional motor control system 900.

In the meantime, the disturbance suppressor 319 may have a similar constitution as in the control system 160 (see FIG. 7B).

As shown in FIG. 7B, the disturbance suppressor 319' includes a signal processor 319e, a precorrector 319f, and a postcorrector 319g.

The signal processor 319e corresponds to the signal processor 170 in the control system 160.

The precorrector 319f and the postcorrector 319g are constituted to correct the control input signal (control input $u_0$) outputted from the position controller 318. The precorrector 319f corresponds to the precorrector 180 in the control system 160. The postcorrector 319g corresponds to the postcorrector 190 in the control system 160. As shown in FIG. 7B, the disturbance suppressor 319' corrects the control input signal (control input $u_0$) outputted from the position controller 318, and inputs a corrected control input signal (control input $u_c$) into the driving circuit 53 in a same manner as in the control system 160.

The disturbance suppressor 319' constituted as such can also accurately suppress disturbance and control the rotation amount θ of the CR motor 51 to the target position $\theta_r$.

[Others]

While the embodiments of the present invention have been described above, the present invention is not limited to the above embodiments but various modifications thereof may be adopted. For example, a linear encoder may be used as the encoder 55 instead of the rotary encoder.

Specifically, the printer apparatus 1 may include a linear encoder that detects a position of the carriage 41. The linear encoder is composed of a timing slit having slits formed thereon at constant minute intervals along the guide shaft 43; and a sensor element provided in the carriage 41. The sensor element reads off the intervals of the slits formed on the timing slit and outputs pulse signals corresponding to the position of the carriage 41.

In this case, based on the pulse signals of the linear encoder, the speed detector 311 measures the speed of the carriage 41, and the position detector 316 measures the position of the carriage 41 on the carriage conveyance path. The CR motor controller 31 and the LF motor controller 35 may be constituted to use the above measured speed and position as measurements representing the control output y.

Each constitutions described in the embodiments corresponds to that described in claims as follows: The encoder 55, the speed detector 311, and the position detector 316 are examples of a measurement unit. The first signal processors 120, 314a, and 319a are examples of a first signal processing unit. The second signal processors 130, 314b, and 319b are examples of a second signal processing unit.

The correctors 150, 314d, and 319d, and the correction signal generators 140, 314c, and 319c; or the precorrectors 180, 314f, and 319f, and the postcorrectors 190, 314g, and 319g are examples of a correction input unit. The signal processors 170, 314e, and 319e are examples of a signal processing unit.

The recording head 21 is an example of a printing unit, and the CR motor 51 is an example of a motor that conveys the printing unit.

What is claimed is:

1. A motor control device comprising:
   a correction input unit that corrects a control input signal outputted from a controller, and inputs a corrected control input signal into a motor;
   a measurement unit that measures a physical quantity resulting from rotation of the motor corresponding to a control output;
   a first signal processing unit that inputs a measurement signal representing the physical quantity inputted from the measurement unit into an inverse model 1/G of a transfer function G of a controlled object, and filters an output of the inverse model 1/G through a first low-pass filter; and
   a second signal processing unit that obtains a corrected control input signal to be inputted into the motor by the correction input unit, and filters the control input signal through a second low-pass filter,
   wherein a cutoff frequency of the second low-pass filter is set to be higher than that of the first low-pass filter, and
   wherein the correction input unit corrects the control input signal outputted from the controller by adding a signal filtered by the second signal processing unit to the control input signal outputted from the controller and also by subtracting a signal filtered by the first signal processing unit from the control input signal.

2. The motor control device according to claim 1,
   wherein the first signal processing unit inputs the measurement signal representing the physical quantity inputted from the measurement unit into a synthetic transfer function obtained by synthesizing the inverse model 1/G and a transfer function corresponding to the first low-pass filter, and outputs an output of the synthetic transfer function as the filtered signal.

3. A motor control device comprising:
   a correction input unit that corrects a control input signal outputted from a controller, and inputs a corrected control input signal into a motor;
   a measurement unit that measures a physical quantity resulting from rotation of the motor corresponding to a control output; and
   a signal processing unit that inputs a measurement signal representing the physical quantity inputted from the measurement unit into an inverse model 1/G of a transfer function G of a controlled object, and filters an output of the inverse model 1/G through a low-pass filter represented by a transfer function $F(\omega 1)$, which represents a cutoff frequency $\omega 1$,
   wherein the correction input unit comprises:
      a precorrection unit that corrects the control input signal outputted from the controller by subtracting a signal filtered by the signal processing unit from the control input signal outputted from the controller; and
      a postcorrection unit that corrects a control input signal corrected by the precorrection unit by inputting the corrected control input signal into a transfer function $H=1/(1-F(\omega 2))$ composed of a transfer function F(ω2) having a higher cutoff frequency ω2 than that of the transfer function F(ω1) of the low-pass filter, and the motor control device being constituted to input an output of the transfer function H into the motor.

4. The motor control device according to claim 3, wherein the signal processing unit inputs the measurement signal representing the physical quantity inputted from the measurement unit into a synthetic transfer function obtained by synthesizing the inverse model 1/G and the transfer function F(ω1) corresponding to the low-pass filter, and outputs an output of the synthetic transfer function as the filtered signal.

5. An image forming system comprising a motor that conveys a printing unit, the image forming system conveying the printing unit by applying driving force from the motor to form an image onto a sheet facing the printing unit on a conveyance path, the image forming system further comprising a motor control device that comprises:

a correction input unit that corrects a control input signal outputted from a controller, and inputs a corrected control input signal into a motor;

a measurement unit that measures a physical quantity resulting from rotation of the motor corresponding to a control output;

a first signal processing unit that inputs a measurement signal representing the physical quantity inputted from the measurement unit into an inverse model 1/G of a transfer function G of a controlled object, and filters an output of the inverse model 1/G through a first low-pass filter; and a second signal processing unit that obtains a corrected control input signal to be inputted into the motor by the correction input unit, and filters the control input signal through a second low-pass filter, wherein a cutoff frequency of the second low-pass filter is set to be higher than that of the first low-pass filter, and wherein the correction input unit corrects the control input signal outputted from the controller by adding a signal filtered by the second signal processing unit to the control input signal outputted from the controller and also by subtracting a signal filtered by the first signal processing unit from the control input signal, wherein the measurement unit measures either of a speed and a position of the printing unit, and a rotational speed and a rotation amount of the motor, which vary due to the rotation of the motor, as the control output, and wherein the motor control device controls the motor and conveys the printing unit based on the measurement signal obtained from the measurement unit.

6. The motor control device according to claim 5, wherein the first signal processing unit inputs the measurement signal representing the physical quantity inputted from the measurement unit into a synthetic transfer function obtained by synthesizing the inverse model 1/G and a transfer function corresponding to the first low-pass filter, and outputs an output of the synthetic transfer function as the filtered signal.

* * * * *